Patented Apr. 11, 1950

2,503,915

UNITED STATES PATENT OFFICE 2,503,915

AMINOPHENOLS AS STABILIZERS FOR DIPHENYL POLYHALOETHANE EMULSIONS

Frank M. Majewski, Philadelphia, Pa., assignor to Rohm & Haas Company, Philadelphia, Pa., a corporation of Delaware No Drawing. Application January 6, 1948, Serial No. 809

5 Claims. (Cl. 167—42)

This invention relates to stabilized insecticide concentrates. These concentrates are characterized on the one hand by their chemical composition, being comprised for the most part of a diphenyl haloethane, commonly with an emulsifying agent, and an organic solvent, and on the other hand by properties which include stability of the concentrate upon storage, noncorrosiveness toward metals, and, when an emulsifying agent is included in the composition, retention of favorable emulsibility after storage. The concentrates of this invention are further characterized by the presence of minor amounts of stabilizing agent.

Since the time of discovery of the lethal qualities toward insects of the diphenyl polyhaloethanes, there has been more and more effort directed toward improved methods of making these compounds available in forms which are convenient for the preparation of sprays for ready and effective application. For many uses the diphenyl polyhaloethanes are desirably dissolved in organic solvents. The diphenyl polyhaloethanes need not be purified but may be the grade commonly found in commerce, containing impurities which themselves may either cause or assist in causing deleterious changes. These compounds may be conveniently handled as concentrates which are suitable for the preparation of finished household, industrial, agricultural, and premise sprays upon mere dilution with such common solvents as kerosene. Alternatively, the concentrates may be combined with an emulsifying agent which then permits extension with water for economical application at the site for use.

It has been observed that, when the concentrated solutions of commercial diphenyl haloethanes are stored in metal containers, these solutions are corrosive. This is true also for the more dilute solutions, although in this case the action is slower and usually less severe. During storage there may occur some slight alteration of the compounds in solution. It has been further observed that aged solutions containing emulsifying agents are not so satisfactorily emulsified as fresh solutions. When such preparations are diluted with water, the resulting emulsions often lack desired stability and application properties. There has, therefore, arisen a real need for stabilizing solutions of diphenyl haloethanes and protecting them against deleterious changes during storage.

For preserving organic solvent solutions of diphenyl haloethanes there is added thereto a small stabilizing amount of an aminomethyl substituted phenol, the exact amount added depending upon such factors as the particular diphenyl haloethane used, the particular conditions to be met as to length of storage, nature of container, and the like. Some haloethanes are less stable than others and are desirably compounded with somewhat more of a given aminomethyl phenol than other haloethanes. There are also slight differences in the protective and stabilizing actions of individual aminomethyl phenols, which may be varied as to their N-substituents and also their phenyl substituents, as will be more fully described hereinafter.

Diphenyl haloethanes which possess insecticidal properties includes ethanes having two or three chlorine or bromine atoms on one of the ethane carbon atoms. The other ethane carbon atom carries two phenyl groups which may be unsubstituted or substituted and may be alike or different. Typical diphenyl haloethanes are 1,1,1-trichloro-2,2-bis(chlorophenyl)-ethane, 1,1,1-tribromo-2,2-bis(chlorophenyl)ethane, 1,1,1-trichloro-2,2-bis(fluorophenyl)ethane, 1,1,1-trichloro-2,2-bis(bromophenyl)ethane, 1,1-dichloro-2,2-bis(bromophenyl)-ethane, 1,1-dichloro-2,2-bis(chlorophenyl)ethane, 1,1-dichloro-2,2-bis(fluorophenyl)ethane, 1,1,1-trichloro-2,2-bis(chlorotolyl)ethane, 1,1,1-trichloro-2,2-diphenyl-ethane, 1,1,1-trichloro-2,2-ditolyl-ethane, 1,1,1-trichloro-2,2-di(ethylphenyl)ethane, 1,1-bis(acetylphenyl-2,2,2-trichloroethane, 1,1-dichloro-2,2-ditolyl-ethane, 1,1-dichloro-2,2-di(ethylphenyl)ethane, 1,1,1-trichloro-2-phenyl-2-chlorophenylethane, 1,1,1-trichloro-2-tolyl-2-chlorophenylethane, 1,1,1-tribromo-2,2-tolyl-ethane, 1,1,1-trichloro-2,2-bis(chloronitrophenyl)ethane, 1,1,1-trichloro-2,2-bis(methoxyphenyl)ethane, 1,1,1-tribromo-2,2-bis(methoxyphenyl)ethane, 1,1,1-trichloro-2,2-bis(ethoxyphenyl)ethane, 1,1,1-trichloro-2-chlorophenyl-2-methoxyphenyl-ethane, 1,1-dichloro-2-bromophenyl-2-methoxyphenyl-ethane, 1,1-thiocyanophenyl-2,2,2-trichloro-ethane, and the like. The substituents of the phenyl rings may be in ortho, meta, or para positions. The actual materials of commerce usually consist of a mixture of isomers.

Solutions of one or more of the diphenyl haloethanes are made with various types of organic solvents, including hydrocarbons, ketones, ethers, esters, and chlorinated solvents, or mixtures thereof. Such solvents include benzene, toluene, xylene, isopropyl benzene, and other alkylated benzenes, various methylnaphthalenes, and other alkylated naphthalenes, aromatic naphthas, cyclohexane and alkylated derivatives, tetrahydronaphthalene, dioxane, isopropyl ether, ethyl ether, ethyl acetate, butyl acetate, benzyl benzoate, diethyl phthalate, o-dichlorobenzene, trichloroethylene, dichloroethane, chloroform, trichloroethane, tetrachloroethane, methylene chloride, acetone, cyclohexanone, etc.

Emulsifying agents useful in solutions of diphenyl haloethanes are those which are organic solvent-soluble. These include sulfonated oils, such as sulfonated castor oil, sulfated long chained alcohols, sulfonated esters, amides, and ethers, and also sulfonated hydrocarbons, such as petroleum sulfonates which are soluble in both oil and water. Specific examples include salts of sulfonated ethyl amide of oleic acid, the dioctyl ester of sulfosuccinic acid in the form of alkali or amine salts, octylphenoxyethoxyethoxyethyl sulfonates, the triethanolamine salt of sulfated lauryl alcohol, etc. There may also be used solvent-soluble, soap-like quaternary ammonium compounds, such as oleyl dimethyl benzyl ammonium chloride. Another type of emulsifying agent is the non-ionic, in which type there are included reaction products of long chained alcohols, acids, amines, and amides with ethylene oxide to give polyethoxyethanols which are soluble in the organic solvents used and yet disperse into solution readily in water. Similarly, sugars, glycols, or alkylene oxides and fatty acids may be condensed to give emulsifying agents. Some typical compounds of the type just described are dodecyloxypolyethoxyethanol, the mixed polyethers from commercial mixtures of $C_8$ to $C_{16}$ alcohols and ethylene and propylene oxides, N-dioctylaminopolyethoxyethanol, sorbitan monolaurate or stearate or oleate, and ethylene oxide reaction products thereof, etc.

The reaction products of alkylated phenols give particularly valuable emulsifying agents, such as octylphenoxypolyethoxyethanol, amylphenoxypolyethoxyethanol, or soluble polymeric emulsifying agents from alkylated phenols linked through methylene bridges and solubilized with ethylene oxide which forms polyethoxy ethanol groups at the phenolic hydroxyls.

Yet another useful type of emulsifier is that resulting by the formation of partial esters of polyhydric compounds and long chained fatty acids, such as the condensation of polyglycerol and a fatty acid. This last type may be modified with a small amount of a dibasic acid, such as maleic or phthalic to give a slightly resinous character to the emulsifying agent and thus provide sticking qualities.

Mixtures of emulsifying agents are often desirable. The usual amount of emulsifying agent or agents corresponds to about 1% to about 15%, although there are cases where smaller or larger percentages are useful.

The solutions of diphenyl haloethanes may be further modified by addition of other insecticidal agents, which exert a complementary effect or, in some cases, a synergistic action. Suitable additional insecticides may be illustrated with pyrethrum 20:1 extract, rotenone solutions, as in camphor-sassafrassy oil, or the solvent-soluble organic thiocyanates, which as a class possess marked narcotic and lethal action towards insects. Typical thiocyanates include hexyl thiocyanate, octyl thiocyanate, dodecyl thiocyanate, butoxyethyl thiocyanate, butoxyethoxyethyl thiocyanate, thiocyanoethyl laurate, cyclohexyl thiocyanoacetate, terpenyl thiocyanoacetate, thiocyanoethyl ether, and the like.

The agents which have been found effective for stabilizing solutions of diphenyl polyhaloethanes are aminomethyl substituted phenols. Amounts of 0.03% to about 1% of the total composition are generally effective, although both smaller amounts and larger amounts may be useful and desirable under some circumstances, as has been explained above. The aminomethylphenols may be in the form of pure compounds or of mixtures or may be even resinous in character. They are derivable from halomethylated phenols by reaction of amines having hydrogen on the nitrogen. They are also obtainable by condensing a phenol having active hydrogen atoms in nuclear positions available for substitution, formaldehyde, and a primary or secondary amine, which is desirably a non-aromatic amine. The latter term is used to define amines in which the nitrogen is not bound directly to a benzene nucleus but to an aliphatic or cycloaliphatic carbon atom.

Some typical aminomethylphenols are dimethylaminomethylphenol, bis(dimethylaminomethyl) phenol, tris(dimethylaminomethyl) phenol, diethylaminomethylphenol, dibutylaminomethylphenol, diamylaminomethylphenol, dioctylaminomethylphenol, di(hydroxyethyl)aminomethylphenol, dimethylaminomethyl-o-phenylphenol, dimethylaminomethyl-cyclohexylphenol, dimethylaminomethylcresol, tert.-butyl-dimethylaminomethylphenol, amyl-dimethylaminomethylphenol, butyl-methyl-dimethylaminomethylphenol, butyl-bis(dimethylaminomethyl) phenol, butyl-morpholinomethylphenol, methylpiperidinomethylphenol, butyl-ethylaminomethyl-morpholinomethyphenol, butyl-butylaminomethylphenol, 2,2-bis(dimethylaminomethyl-hydroxy-phenyl) propane, bis(diethylaminomethyl)-dihydroxydiphenyl, dicyclohexylaminomethylphenol, etc. The preferred aminomethylphenols contain one or two aminomethyl groups with N-substituents of one to eight carbon atoms. The phenyl nucleus may be substituted with a hydrocarbon group which preferably does not contain more than eight carbon atoms.

The preferred aminomethylphenols may be represented by the formula

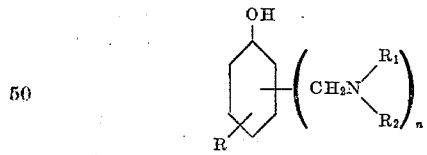

where $R_1$ represents hydrogen or a hydrocarbon group of one to eight carbon atoms, $R_2$ represents a hydrocarbon group of one to eight carbon atoms, $R_1$ and $R_2$ taken together represent a saturated divalent group forming a heterocycle with the amine nitrogen atom, $n$ represents an integer from one to two, and R represents hydrogen or a hydrocarbon group of not over eight carbon atoms.

In addition to a stabilizing agent, there may be used a corrosion inhibitor, such as an oil-soluble alkali or alkaline earth salt of a petroleum sulfonate, especially one of a petroleum sulfonic acid with a molecular weight of 400 to 1000. Amounts of 0.1% to 5% of such agents with 0.25% to 2% being preferred are helpful in protecting metal containers from rapid corrosion. Other agents for other specific purposes may be added, including not only spreading and sticking agents but also anti-foam agents, such as complex organic phosphates.

The following are examples of useful compositions according to this invention, parts being by weight:

A. Materials:
| | Parts |
|---|---|
| Diphenyl polyhaloethane | 10–30 |
| Aminomethylphenol | 0.03–1 |
| Solvent | To make 100 |

B. Materials:
| | Parts |
|---|---|
| Diphenyl polyhaloethane | 15–30 |
| Aminomethylphenol | 0.03–1 |
| Petroleum sulfonate | 0.1–5 |
| Solvent | To make 100 |

C. Materials:
| | Parts |
|---|---|
| Diphenyl polyhaloethane | 20–30 |
| Emulsifying agent | 3–12 |
| Stabilizing agent (aminomethyl phenol) | 0.03–1 |
| Solvent | To make 100 |

D. Materials:
| | Parts |
|---|---|
| Diphenyl polyhaloethane | 20–30 |
| Emulsifying agent | 1–15 |
| Stabilizing agent (aminomethylphenol) | 0.03–1 |
| Petroleum sulfonate | 0.1–2 |
| Solvent | To make 100 |

In the following specific combinations observations are presented on behavior and properties of various formulations.

A composition was prepared containing 1,1-di(chlorophenyl)-2,2,2-trichloroethane 25%, octylphenoxypolyethoxyethanol 6%, butyl-dimethylaminomethylphenol 0.5%, a sodium petroleum sulfonate 0.2%, and methylated naphthalenes 68.3%. This composition, when diluted with water, gives emulsions of sufficient stability for effective application against mosquito larvae, insects on plants, and the like. After storage for six months in an iron drum the good emulsifying properties are retained. A similar composition, lacking, however, the butyl-dimethylaminomethylphenol, rapidly corrodes the metal of the container, forms a sludge, and after several weeks begins to fail in respect to giving satisfactory emulsions.

A composition that contained 30% of 1,1-di(chlorophenyl)-2,2,2-trichloroethane dissolved in an aromatic naphtha having a high kauri-butanol value was observed to be corrosive to both iron drums and tinned cans. The addition of 0.03% of p-tert.-butyl-bis(dimethylaminomethyl) phenol definitely checked the corrosive action of this solution toward both types of containers. This composition is useful as an insecticidal concentrate for the preparation of household sprays, mill sprays, and the like by dilution with naphtha.

To provide preparations which have excellent knock-down characteristics, good ovicidal action, and high kills, there are mixed dichlorophenyl-trichloroethane, thiocyanoethyl laurate, butoxyethoxyethyl thiocyanate, and solvents in proportions to provide a composition containing 21% of dichlorophenyl-trichloroethane and 7% of each of the organic thiocyanates. This serves as an insecticidal concentrate which can be diluted to give sprays useful against flies, mosquitoes, moths, and the like but may also be used as an industrial spray against these and other insects including mill insects, weevils, etc. The solution is corrosive toward metal containers, evidently as the result of changes in commercial trichloroethane. The addition of 0.03% to 1% of an aminomethylphenol inhibits this effect, permitting the storage of the solution in drums and cans over many months without development of sludge or rust and without loss of activity.

Preparation of a solution of 25% of dichlorophenyl dichloroethane, 10% of thiocyanoethyl laurate, 5% of emulsifying agent such as polymers of octylphenoxypolyethoxyethanol in which three to five phenyl nuclei are joined by methylene links, and 60% of solvents, principally alkylated aromatics, yields a concentrate which can be added in the proportions of one pint to one gallon to 100 gallons of water to form effective sprays for combatting leafhoppers, aphids, potato bugs, flea beetles, cabbage worms, etc. on plants. The solution, however, slowly corrodes metal containers and falls off in emulsifying properties and activity. The revision of the above formulation to include 0.3% of bis(dimethylaminomethyl) cresol effectively prevents deterioration of emulsifying properties and allows retention of high insecticidal activity over many months of storage.

A concentrate prepared with 20% of di(methoxyphenyl) trichloroethane, 10% of a solution of rotenone in camphor-sassafrassy oil, and aromatic hydrocarbons is slowly corrosive to metal containers during storage for two months. The modification of this basic formula by inclusion of 0.25% of butyl-dimethylaminomethyl-morpholino-methyl-phenol and 0.25% of a calcium petroleum sufonate gives a relatively non-corroding solution which retains its full activity for more than six months. The further modification of this basic formula to include 5% of an emulsifying agent yields a concentrate useful in aqueous sprays as a general insecticide for protecting plants and also of value in protecting live stock against flies, lice, and warbles. Emulsions from the stabilized concentrates are excellent whereas, even after a few weeks, the emulsions from concentrates lacking the stabilizer are unsatisfactory.

From the above specific formulations the beneficial effects obtained by the presence of small amounts of aminomethylphenols in the solutions of diphenyl polyhaloethanes are evident. The compositions thus illustrated are desirable because they overcome serious corrosion of containers, contamination of the compositions, and deterioration of the active agent or agents. They furthermore retain the emulsifying properties of those concentrates to which a stabilizing agent has been added along with an emulsifying agent.

The preservation of emulsifying properties is a particularly valuable aspect of this invention. Where no stabilizing agent is used, it frequently happens that all power of emulsifying is lost upon prolonged storage. The change in this characteristic has been followed in series of accelerated ageing tests, of which the following is typical.

An insecticidal concentrate was prepared from two parts of a water-soluble condensate of bis(diamylhydroxyphenyl) methane and ethylene oxide, three parts of a polyglycerol-lauric acid condensate, 25 parts of 1,1,1-trichloro-2,2-bis(chlorophenyl) ethane, 0.4 part of a sodium petroleum sulfonate from petroleum sulfonic acids of molecular weights from 400 to 600, 0.3 part of dimethylaminomethylphenol, and 69.3 parts of aromatic naphtha. Portions of this concentrate were stored in glass bottles, in iron drums, in tinned cans, and in terneplated cans and placed in a room maintained thermostatically at 53° C.

A control was prepared from two parts of the same condensate of bis(diamylhydroxyphenyl) methane and ethylene oxide, from three parts of the polyglycerol-lauric acid condensate, 25 parts of the same lot of 1,1,1-trichloro-2,2-bis(chlorophenyl) ethane, and 70 parts of the aromatic solvent used above. Portions of this control preparation were likewise stored in glass, iron, tinned iron, and terneplated iron containers and placed in the same hot room.

From time to time samples from each type of container were drawn and examined for emulsibility by shaking 20 ml. of concentrate with 80 ml. of a hard water and observing whether or not a stable emulsion was then obtained. Where the emulsions broke, comparisons were made of the volume of the layer formed from solvent solution at a fixed time.

At the start, all samples gave stable emulsions in the test. After about a week, loss of stability was found for the control samples taken from the iron containers. In about three weeks, the control samples from the terneplated containers were found to give unstable emulsions. In about five weeks, the stability of the unstabilized control samples in tinned containers had gone and shortly thereafter samples in glass lost their desired emulsifying properties.

At the end of seven weeks, a comparison of tests for the control samples showed a separation of a 25 ml. layer for samples from iron and terneplated containers with the difference that curds formed in the samples from iron containers. In the tests of control samples from tinned containers, layers of 22 ml. separated, while layers of 18 ml. formed in tests of samples which had been stored in glass.

No deterioration was found in any of the stabilized samples stored in the same types of containers used for storage of the controls. Good, stable emulsions were obtained in all cases without layer formation or development of curds during the tests. All of these samples retained the properties which are requisite for proper application.

The diphenyl polyhaloethanes which have been found useful in compositions illustrated above are of the general formula

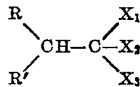

wherein R and R' are phenyl nuclei, $X_1$ and $X_2$ are halogens, specifically chlorine or bromine, and $X_3$ is hydrogen or a halogen. These compounds are commonly used at concentrations of 10% to 30% in insecticide concentrates and at lower concentrations; e. g., about 0.1% to 5%, in diluted spray preparations.

I claim:

1. A stabilized, self-emulsible composition of matter which retains favorable emulsibility during storage comprising 20 to 30 parts of a diphenyl polyhaloethane, 1 to 15 parts of an emulsifying agent, 0.03 to 1 part of an aminomethylphenol, and organic solvent to make 100 parts by weight.

2. A stabilized, self-emulsible composition of matter which retains favorable emulsibility during storage comprising 20 to 30 parts of a diphenyl polyhaloethane, 3 to 12 parts of an emulsifying agent, 0.03 to 1 part of an aminomethylphenol, 0.1 to 5 parts of a rust inhibitor, and organic solvent to make 100 parts by weight.

3. A stabilized, self-emulsible composition of matter which retains favorable emulsibility during storage comprising 20 to 30 parts of 1,1-bis-(chlorophenyl)-2,2,2-trichloroethane, 1 to 15 parts of emulsifying agent, 0.03 to 1 part of an aminomethylphenol, and organic solvent to make 100 parts by weight.

4. A stabilized, self-emulsible composition of matter which retains favorable emulsibility during storage comprising 20 to 30 parts of 1,1-bis-(chlorophenyl)-2,2,2-trichloroethane, 3 to 12 parts of an emulsifying agent, 0.03 to 1 part of a dimethylaminomethylphenol, and organic solvent to make 100 parts by weight.

5. The composition of claim 4 in which the dimethylaminomethylphenol is mono(dimethylaminomethyl)phenol.

FRANK M. MAJEWSKI.

REFERENCES CITED

The following references are of record in the file of this patent:

UNITED STATES PATENTS

| Number | Name | Date |
|---|---|---|
| 2,040,039 | Bruson | May 5, 1936 |
| 2,114,122 | Bruson | Apr. 12, 1938 |
| 2,220,834 | Bruson | Nov. 5, 1940 |
| 2,363,134 | McCleary | Nov. 21, 1944 |
| 2,363,778 | Pedersen | Nov. 28, 1944 |

OTHER REFERENCES

Gunther et al., Science, Aug. 30, 1946, page 203.

Jones et al., J. Econ. Ent., vol. 38, No. 2, Apr. 1945, pages 207–210.